Aug. 25, 1942.   B. C. SCHEUFELE   2,294,003
TRACTOR TRAILER AIRPLANE
Filed May 24, 1941   3 Sheets-Sheet 3
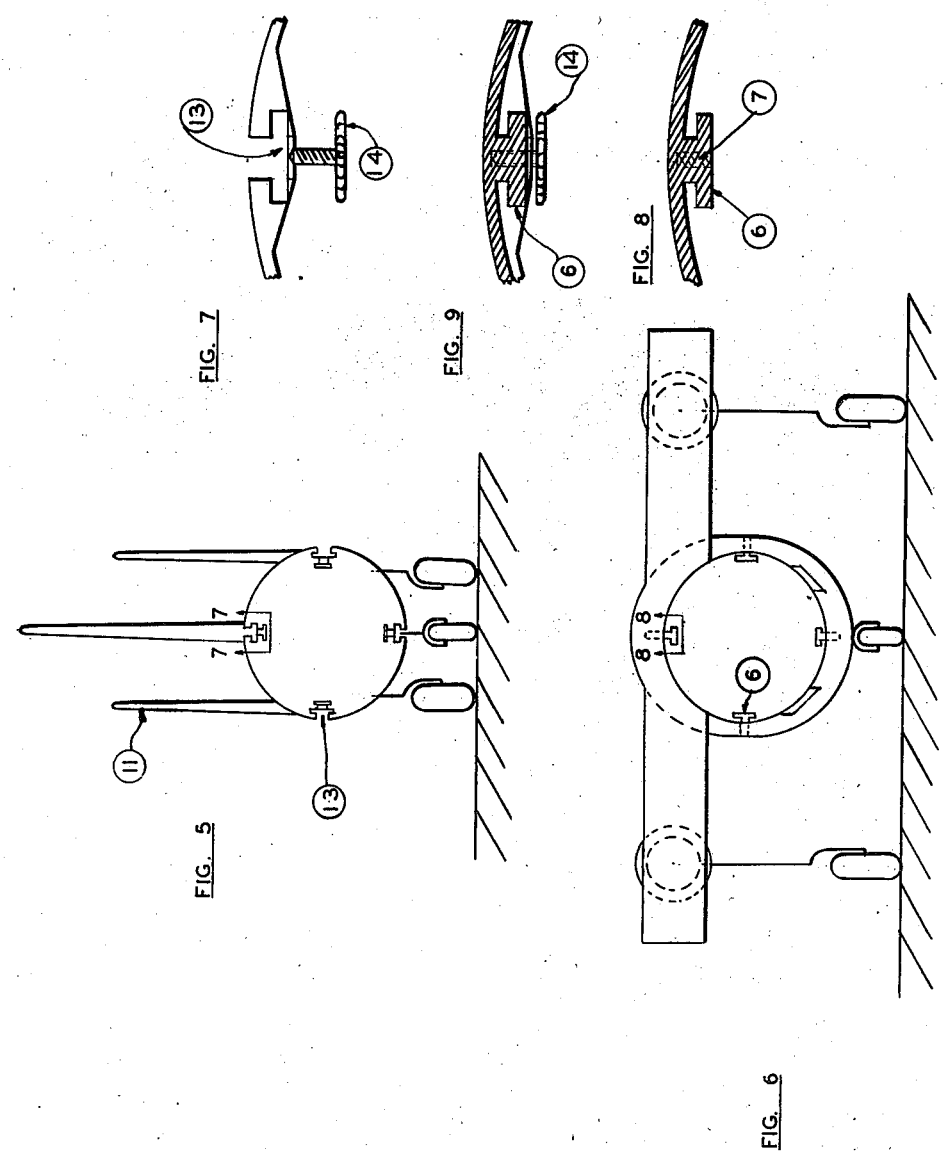
Benjamin C Scheufele INVENTOR.

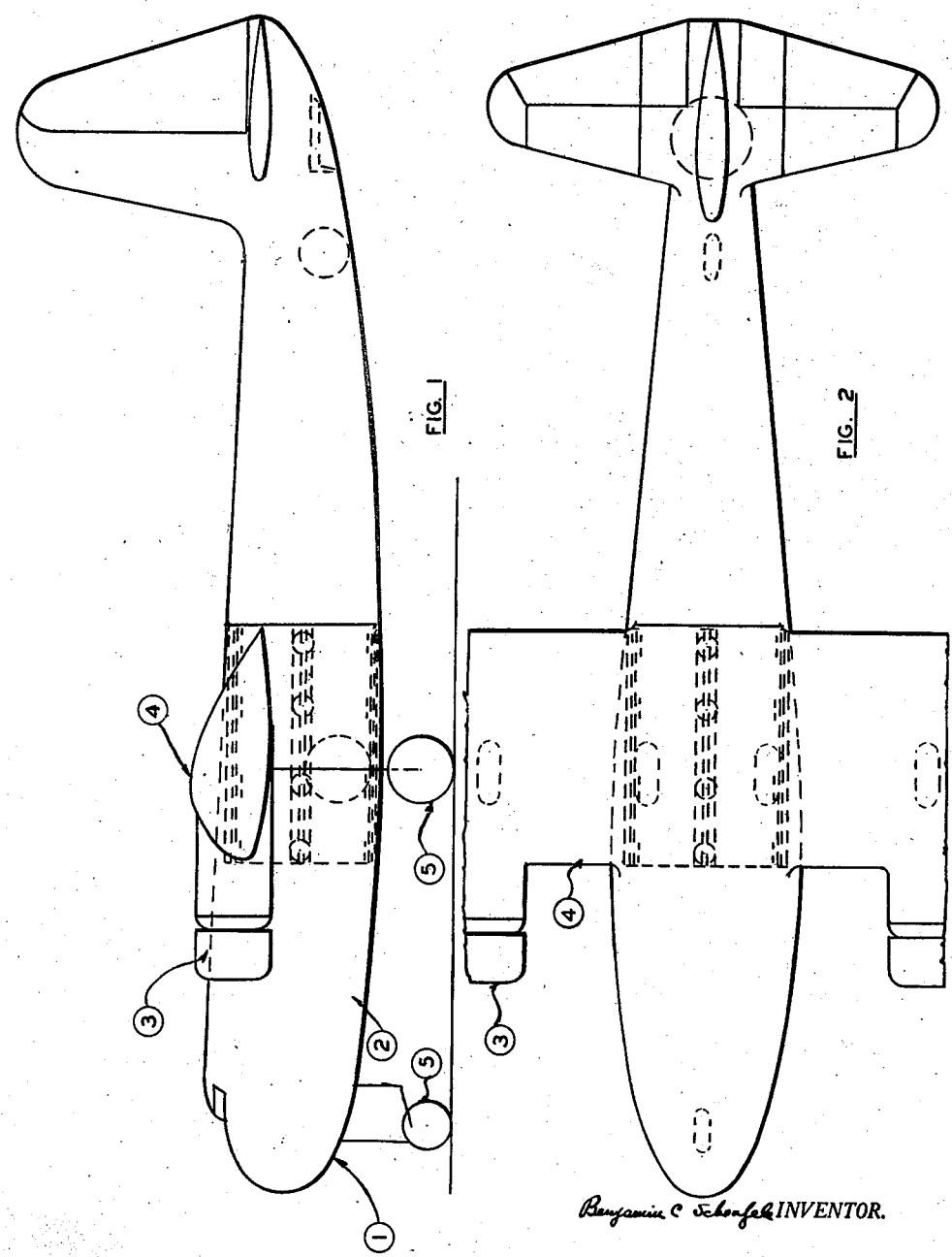

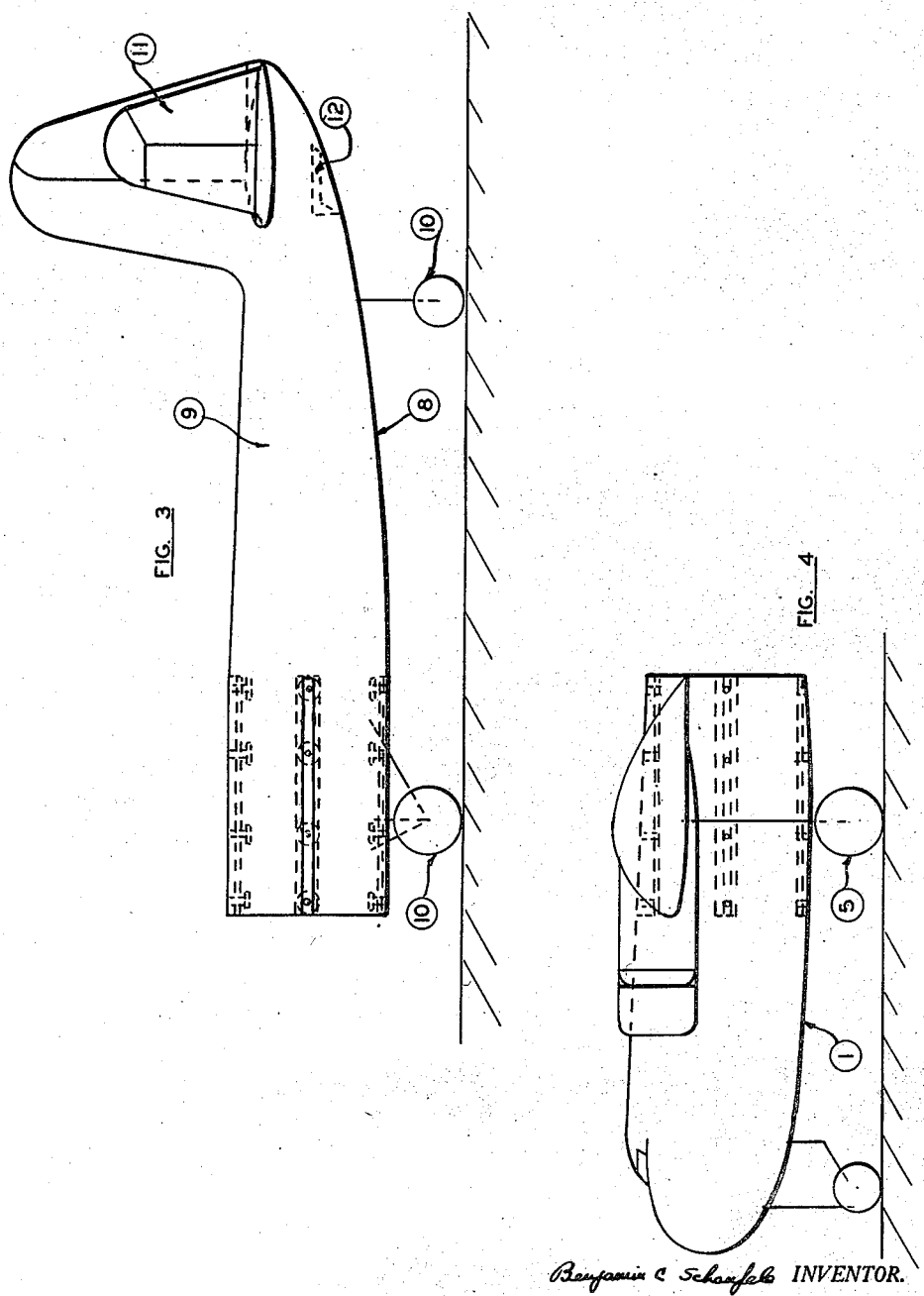

Patented Aug. 25, 1942

2,294,003

UNITED STATES PATENT OFFICE 2,294,003

TRACTOR TRAILER AIRPLANE

Benjamin C. Scheufele, Philadelphia, Pa.

Application May 24, 1941, Serial No. 394,974

3 Claims. (Cl. 244—2)

Present traffic conditions on air lines, particularly with regard to freight, call for vehicles which can deliver a load at some distance from the air port without unloading the vehicle. At the same time, it is desirable that the airplane, or that part of it containing the motive power, be kept busy as constantly as possible. It is, therefore, a feature of my invention to provide an airplane composed of two parts which are readily connected and disconnected. One part I have chosen to call the tractor and this contains the motive power or engines of the airplane as well as the main wing structure. The other part I have chosen to call the trailer and this contains space for the airplane load together with the tail structure which can be readily folded as well as wheels or other running gear so that the trailer section may be towed on the road by an automobile, truck, tractor or other road mobile device.

For a further exposition of my invention, reference may be had to the annexed drawings and specification at the end thereof my invention will be specifically pointed out and claimed.

In the drawings:

Fig. 1 is a side elevation.

Fig. 2 is a top plan view with a portion of the air wing structure omitted.

Fig. 3 is a side view of the trailer detached.

Fig. 4 is a side view of the tractor detached.

Fig. 5 is a front elevation of the trailer detached.

Fig. 6 is a rear elevation of the tractor with the main wing structure omitted.

Fig. 7 is an end view on an enlarged scale on the plane indicated by the line 7—7 of Fig. 5.

Fig. 8 is a cross-section on an enlarged scale on the plane indicated by the line 8—8 of Fig. 6.

Fig. 9 is a cross-section similar to Figs. 7 and 8 showing the parts in assembled position.

In that embodiment of my invention chosen from among others for illustration in the drawings and description in the specification, my device is shown as consisting of a tractor generally indicated at 1 and having a fuselage 2 on which are mounted the motive power devices or engines 3 together with the center wing section 4. The fuselage 2 also carries wheels 5 which are frequently made retractable so that they are used during landing and retracted during flight.

As is best seen in Figs. 4, 6, 8 and 9, fuselage 2 carries, at its rear, rails 6 which have, at spaced portions along their centers, threaded openings 7.

My device also comprises a trailer generally indicated at 8 and having a fuselage 9 on which are mounted wheels 10 which may be made retractable so that they are used during movement of the trailer on the ground and are retracted while the aeroplane is in the air. Trailer 8 carries, at its rear, tail surfaces 11 which, as is best seen in Fig. 5, may conveniently be made so as to fold into vertical position to provide clearance and maneuverability when the trailer is towed on the road. For the purpose of towing the trailer along the road, I provide a tractor-hitch 12 of any well known type. This is not shown in detail as it comprises a standard piece of apparatus.

As is conveniently seen in Figs. 3, 5, 7 and 9, trailer 8 carries at its front end notches or slots 13 of a size convenient to receive rails 6 snugly therein. Adjacent slots 13 are provided hand wheels or screws 14 which co-operate with holes 7 to fasten tractor 1 and trailer 8 together in firm connection which, however, is readily attachable and detachable.

The operation of my device will be obvious from the foregoing. Assuming the tractor 1 and the trailer 8 to be detached and standing on the ground on the wheels 5 and 10, respectively, tractor 1 is aligned longitudinally with trailer 8 and the two parts then telescoped together so that rails 6 enter and snugly fit into the slots 13. Hand wheels 14 are then protracted so that the screws enter the holes 7 and attach tractor 1 and trailer 8 together in a convenient, strong and rigid manner.

In the drawings, my device has been indicated as being of the "Monocogue" construction but any other convenient type of construction may be employed.

Modifications may be resorted to within the spirit and scope of my invention, and particularly the rails 6 and the slots 13 may be provided on either the interior or exterior of either the tractor or the trailer.

It will be obvious to those skilled in the art that modification may be made in details of construction and in matters of mere form without departing from the spirit of the invention.

I claim:

1. A cargo-carrying airplane including two completely detachable sections arranged for telescoping engagement with and disengagement from each other and in which the forward section comprises a fuselage on which are mounted the motive power devices and the wing sections, and an after section located aft of the trailing edge of the wing sections and comprising the entire cargo-carrying portion of the airplane and the empennage or tail-structure.

2. An airplane having a longitudinal cargo-carrying structure divided into two separable portions arranged for longitudinal connection and disconnection to and from each other, the forward portion having a fixed streamline fairing and carrying the engines and wing structure, and the after portion having a fixed streamline fairing and carrying the cargo compartment and the tail and dirigible structure, the adjacent walls of said fairings, when said portions are connected, forming therebetween substantially one continuous fairing.

3. A vehicle suitable for sustained flight through the air or for extended travel over the surface of the ground comprising, a trailer fuselage providing in its interior a cargo-carrying compartment and carrying at its rear airplane tail and rudder structure thereon and having a streamline surface, said trailer fuselage being adapted at its forward end for longitudinal connection with and disconnection from an airplane fuselage having a streamline surface which, when said trailer fuselage and said airplane fuselage are connected together, forms with the streamline surface of said trailer fuselage a complete streamline surface, a tractor-hitch connected to said trailer fuselage at the rear end thereof and adapted to connect said trailer fuselage to a road vehicle for movement on the surface of the earth, and wheels mounted on said trailer fuselage and retractable within said streamline surface during passage of the vehicle through the air and extensible for use in landing said vehicle from the air and for aligning the trailer fuselage of said vehicle with said airplane fuselage for attachment thereto or detachment therefrom and suitable for use in the transportation of said vehicle over the surface of the earth.

BENJAMIN C. SCHEUFELE.